United States Patent

Mueller

[15] 3,704,931
[45] Dec. 5, 1972

[54] METHOD AND APPARATUS FOR PROVIDING AN ENHANCED IMAGE OF AN OBJECT

[72] Inventor: Rolf K. Mueller, Brighton, Mich.
[73] Assignee: The Bendix Corporation
[22] Filed: Aug. 30, 1971
[21] Appl. No.: 175,907

[52] U.S. Cl. ............... 350/3.5, 350/162 SF, 340/5 H
[51] Int. Cl. ............................................ G02b 27/22
[58] Field of Search .......... 350/3.5, 162 SF; 340/5 H; 235/181

[56] References Cited

UNITED STATES PATENTS 3,598,471   8/1971   Baldwin ........................ 350/162 SF

*Primary Examiner*—David Schonberg
*Assistant Examiner*—Robert L. Sherman
*Attorney*—John S. Bell et al.

[57] ABSTRACT

An enhanced image of an object is formed using a multicomponent signal having a weak signal component representing the object that is mixed with a strong signal component representing a localized source that tends to mask the weak signal component by multiplying the multicomponent signal by the intensity distribution of the high-frequency portion of that signal. This multiplication provides a multicomponent output signal having one component separate from all other components that provides a clear image of the object. Embodiment for providing images from multicomponent optic signals and from lower frequency multicomponent signals such as acoustic signals are described herein.

15 Claims, 3 Drawing Figures

INVENTOR
ROLF K. MUELLER

BY  *John L. Keil*
ATTORNEY

INVENTOR
ROLF K. MUELLER
BY
ATTORNEY

METHOD AND APPARATUS FOR PROVIDING AN ENHANCED IMAGE OF AN OBJECT

BACKGROUND OF THE INVENTION

1. Field of the Invention

Image enhancement.

2. Brief Description of the Prior Art

There are a number of situations in which it has not been possible to obtain a clear, strong image of an object because in obtaining any signal representing that object one also obtains a stronger signal that does not represent the object and that masks the signal that does represent the object. For example, when an object of interest located proximate a reflecting background is irradiated in order to produce an image of that object, one not only receives a reflected signal from the object, but also a stronger reflected signal from the reflecting background. In seismic exploration, geologic formations of interest are often located near an interface between two types of rock. Acoustic waves reflected from the formation of interest are masked by those reflected from the rock interface. Or, in sonar systems, the signal reflected from a submarine may be masked by signals reflected from the ocean bottom.

SUMMARY OF THE INVENTION

The subject invention comprises a method and apparatus for processing received wave energy signals having a first signal component representing a wave field received from an object that is mixed with and masked by a second signal component that is coherent with the first signal component but that does not represent the object; instead, it represents a localized source, usually a virtual source. The method and apparatus of this invention is particularly useful in providing an enhanced image when the second or masking signal component is larger than the first or object signal component. A strong, clear image of the object is produced by obtaining the high spatial frequency portion of the intensity distribution of the total multicomponent signal and by multiplying the high spatial frequency portion by the total multicomponent signal. The intensity distribution of a wave energy signal is the square of the absolute value of the distribution of that signal. The multiplication provides a multi-portion output signal having one output signal portion comprising the sum of (a) the product of the strong or second component and the intensity or square of the absolute value of the weak or first component, and (b) the product of the weak component and the intensity of the strong component. This output signal component has a separate spatial frequency from all other portions of the output signal. The (b) portion of this signal component provides a clear, strong image of the object.

Two embodiments of the invention are described herein. The first is an optic embodiment in which the high spatial frequency portion of the intensity distribution of a wave energy signal having a weak signal component representing an object is formed by illuminating the object and an unwanted reflecting background proximate that object with laser light from a localized source that is small in size with respect to the size of the object. The rereflecting background provides a strong signal component that represents virtual image of the source of the illuminating laser light. A first area square-law detector having a poor low-frequency response is placed to receive the laser light scattered or reflected by the object and nearby background. An area square-law detector is a detector that records the intensity distribution of an optic signal. This virtual image signal is mixed with and therefore masks the signal receoved from the object. In order to multiply the recorded high-frequency intensity distribution by the total signal received from both the object and the unwanted reflecting background, a hologram is formed by replacing the area square-law detector having a poor low-frequency response with a second area square-law detector such as a photographic film. The object and nearby background are illuminated with laser light. A reference beam of laser light is directed to mix and interfere with the light scattered or reflected from the object and nearby background proximate the photographic film. The hologram is aligned with the recorded area detector, and a reconstruction laser beam is directed to strike the hologram. The reconstruction beam strikes the recorded hologram and causes a multicomponent signal to propagate from that hologram. The reconstruction beam strikes the hologram at an angle such that one component comprising the sum of the strong signal component received from the reflecting background and the weak signal component received from the object propagates in a direction to strike the recorded area detector. This signal is multiplied by the signal recorded on the area detector and causes a multicomponent product signal to propagate from the area detector. One component of the signal propagating from the area detector comprises the product of the square of the absolute value of the strong signal component received from the reflecting background and the weak signal component received from the object. This component propagating from the area detector provides a strong, clear image of the object.

Another embodiment is described herein, in which an object and nearby reflecting background are irradiated with an acoustic signal. An array of recording microphones records the amplitude and frequency of the acoustic wave front scattered or reflected from the object and nearby background. This recorded signal is electronically squared and filtered to form the high spatial frequency portion of the intensity distribution of the signal. This high-frequency intensity distribution is electronically multiplied by the recorded signal. Unwanted components of the multiplication signal are removed by electronic reconstruction apparatus, and the remaining component is supplied to a display apparatus to provide a strong, clear image of the object.

BRIEF DESCRIPTION OF THE DRAWINGS

Further objects, features, and advantages of this invention, which is defined by the appended claims, will become apparent from a consideration of the following description and accompanying drawings in which:

DETAILED DESCRIPTION OF THE PREFERRED EMBODIMENTS

Figure 1:
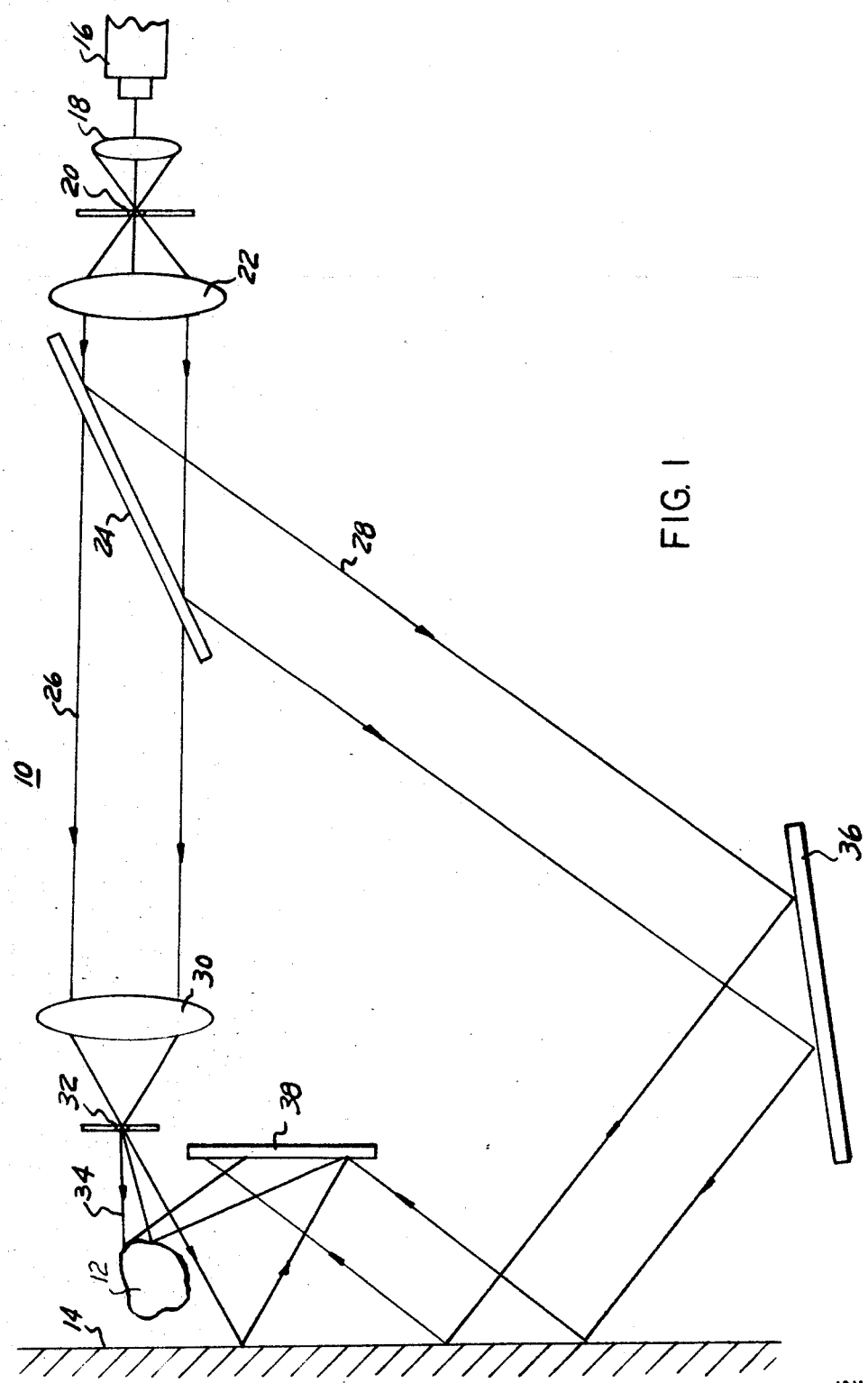
FIG. 1 is a schematic, two-dimensional view of a system that can be used to record either a hologram or the high spatial frequency portion of the intensity distribution of a signal received from an object and an unwanted reflecting background proximate that object.

FIG. 1 illustrates a system 10 comprising an arrangement of optical elements that can be used for recording a hologram of an object 12 disposed near an unwanted reflecting background 14. The system 10 can also be used to record the intensity distribution of wave energy reflected from the object 12 and background 14. A hologram of object 12 and background 14 is formed because a hologram can be conveniently used to recreate the waveform of light energy reflected from object 12 and background 14 when it is desired to multiply that light energy waveform. A holographic recording preserves the amplitude and phase information of an optic wavefront, whereas other recording systems currently available will not because of the high-frequency of light energy.

The system 10 includes conventional apparatus comprising a laser source 16, objective lens 18, pinhole aperture 20, collimating lens 22 and beam splitter 24 for providing two, mutually coherent beams 26 and 28 of laser light. A lens 30 is disposed in the laser beam 26 to focus that beam to a pinhole aperture 32. Aperture 32 is provided so that object 12 and background 14 are illuminated with wave energy from a source that is small with respect to the size of object 12. This causes the signal reflected from background 14 to represent a virtual image of the source or aperture 32. And thus, even though the background signal is stronger than the signal or signal component reflected from object 12, the background signal has a form such that a strong image of object 12 can be obtained according to the method and apparatus of this invention. Laser light spreads from aperture 32, forming a cone-shaped distribution 34 which illuminates object 12 and reflecting background 14. A mirror 36 is positioned to intercept beam 28 and direct that beam to strike reflecting background 14 at a position such that beam 28 reflects from background 14 to intersect and interfere with light from aperture 32 that is reflected or scattered by object 12 and background 14. An area square-law detector 38, such as photographic film is disposed proximate the position of interception to record the resulting interference pattern or hologram.

In operation, a hologram is recorded by activating laser source 16 so that beam 26 propagates from pinhole aperture 32 to illuminate and be scattered from object 12 and background 14 and so that beam 28 is reflected from background 14 to intersect and interfere with the reflected light provided by beam 26 proximate the photographic film 38. The recorded hologram is represented mathematically by the expression:

$$|R + S_1 + S_2|^2 \qquad (1)$$

where:
R = the reflected reference beam 28;

$S_1$ = the weak signal component of the wave field at area square-law detector 38, namely that light reflected from object 12; and $S_2$ = the strong signal component of the wave field at area square-law detector 38, namely, that component reflected from reflecting background surface 14.

The recorded hologram cannot be used alone to provide a strong, clear image of object 12 because during formation of the hologram $S_1$, the light scattered from object 12 is mixed with and is not spatially separated from $S_2$, the light reflected from background 14. Any image formed directly would be mixed with a representation of light reflected from background 14.

The high spatial frequency portion of the intensity distribution of reflected light from aperture 32 that is reflected by object 12 and background 14 is recorded by modifying the system 10 to block propagation of beam 28. For example, an opaque screen can be placed between beam splitter 24 and mirror 36. The photographic film used as an area square-law detector 38 is also replaced by an area square-law detector having a poor low-frequency response, such as a photoplastic recorder. In operation, only light from aperture 32 is reflected by object 12 and background 14 to strike this photoplastic recorder which records the high spatial frequency portion of the intensity distribution of the received light. The intensity distribution of a wave energy signal such as light is the absolute value of the square of the signal and is represented by the mathematic equation:

$$|S_1 + S_2|^2 = |S_1|^2 + |S_2|^2 + S_1{}^*S_2 + S_1S_2{}^* \qquad (2)$$

where:
$|S_1 + S_2|^2$ = the intensity distribution of a light from aperture 32 reflected by object 12 and background 14; and
$S_1{}^*$ & $S_2{}^*$ = the complex conjugate of $S_1$ and $S_2$, respectively.

Because the $S_2$ signal component represents a virtual image of a small or localized source, the mathematic term $|S_2|^2$ represents a low spatial frequency component that is not recorded on the photoplastic recording medium. The high spatial frequency intensity distribution that is recorded is expressed mathematically by:

$$|\widetilde{S}|^2 = S_1{}^*S_2 + S_1S_2{}^* + |S_1|^2 \qquad (3)$$

where:
$|\widetilde{S}|^2$ = the high spatial frequency portion of the intensity distribution of light reflected from object 12 and background 14.

Figure 2:
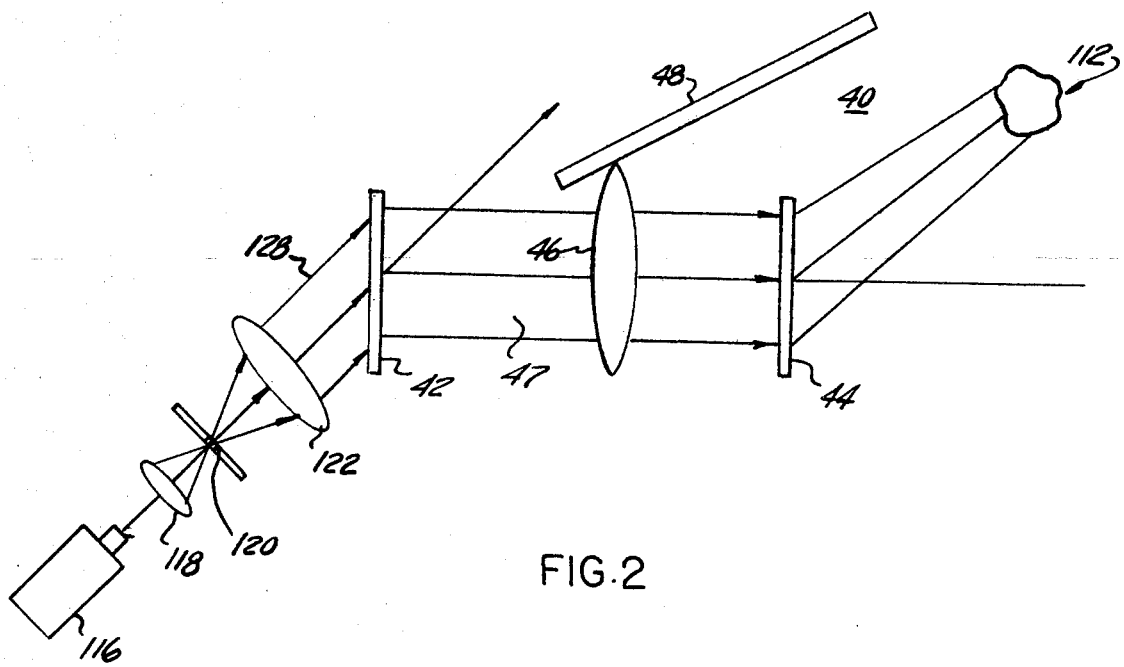
FIG. 2 is a schematic, two-dimensional view of apparatus for multiplying a multicomponent optic signal having strong and weak signal components by the high spatial frequency portion of the intensity distribution of that optic signal to produce a clear, strong image of the weak signal component.

FIG. 2 illustrates a system 40 for using the recorded hologram and the recorded high spatial frequency portion of the intensity distribution obtained with the system of FIG. 1 to provide a clear, strong image of object 12. The system 40 includes a recorded hologram 42 of object 12 and background 14 that is aligned with the recorded intensity distribution 44 of light from aperture 32 that has been reflected from object 12 and background 14. A laser source 116, objective lens 118, pinhole aperture 120, and collimating lens 122 are positioned to provide a beam 128 which is similar to beam 28 and strikes hologram 42 at an angle equal to the angle at which reflected beam 28 struck the area square-law detector 38 in the recording system 10 of FIG. 1. Beam 128 striking hologram 42 causes a multicomponent signal to propagate from that hologram. The various signal components propagate in different directions. A lens 46 is disposed between recorded hologram 42 and recorded intensity distribution 44 in order to image one signal component provided by hologram 42 comprising the sum of the weak and strong signal components $S_1$ and $S_2$ onto recorded intensity pattern 44. An opaque screen 48 is positioned to intercept the other components propagating from recorded hologram 42 so that they will not interfere with the image produced by the multiplication of the $(S_1 + S_2)$ signal striking recorded intensity distribution 44.

In operation, laser source 116 is activated to direct beam 128 to strike recorded hologram 42. Beam 128 striking hologram 42 recreates the distribution of light energy from aperture 32 and that was reflected by object 12 and background 14 in the recording system 10 of FIG. 1. The interaction or multiplication of beam 128 and recorded hologram 42 is expressed mathematically by the expression:

$$R \cdot |R + S_1 + S_2|^2 \quad (4)$$

Beam 128 striking recorded hologram 44 causes a multicomponent signal to propagate from that hologram. One component comprises an image component and is represented mathematically by the expression $(S_1 + S_2)$. This component propagates in a direction different from the directions of propagation of the other components, and is therefore, not masked or obscured by those components. That is, the image component $(S_1 + S_2)$ propagates along direction 47 to strike lens 46. Lens 46 images this component onto the recorded intensity distribution 44 to provide a clear, strong image 112 of object 12. The remaining signal components propagating from hologram 42 propagate along directions separate from direction 47 and do not strike recording intensity distribution 44 and therefore do not produce any signal that would mask the image of object 12. opaque screen 48 intercepts and blocks those components propagating along directions sufficiently close to direction 47 to be able to obscure the image 112 formed by system 40. The multiplication of the light image signal $(S_1 + S_2)$ and the recorded high spatial frequency portion of the intensity distribution 44 is expressed mathematically by the equation:

$$(S_1 + S_2) \cdot |\tilde{S}|^2 =$$
$$2|S_1|^2 S_2 + S_1|S_2|^2 + S_1^* S_2^2 + S_1^2 S_2^* + |S_1|^2 S_1 \quad (5)$$

where:
$2|S_1|^2 S_2$, $S_1|S_2|^2$, $S_1^* S_2^2$, $|S_1|^2 S_1$, and $S_1^2 S_2^*$ = five separate image components propagating in different directions from recorded hologram 42; and
$|S_2|^2 S_1$ = the image component providing the strong, clear image of object 12.

The enhanced image of object 12 is provided by the large $|S_2|^2 S_1$ image component is separate from the two components $S_1^* S_2^2$ and $S_1^2 S_2^*$ propagating from recording 44 and is therefore not masked by those components. The image of object 12 has been enhanced by a factor $|S_2|^2/|S_1|^2$ because of the separation of these $S_1^2 S_2^*$ and $S_2^2 S_1^*$ components from the $|S_2|^2 S_1$ image component. That is, the signal reflected from object 12 has a value of $|S_1/S_2|$ times the unwanted signal reflected from background 14. However, the signal forming image 112 has a value of $|S_2/S_1|$ times the unwanted signal—an enhancement of $|S_2/S_1|^2$. The $|S_2|^2 S_1$ component, while not being spatially separated from the $2|S_1|^2 S_2$ and $|S_1|^2 S_1$ components, is more intense than both of those components because $S_2$ is a larger signal than $S_1$, and is therefore not obscured by those components.

Figure 3:
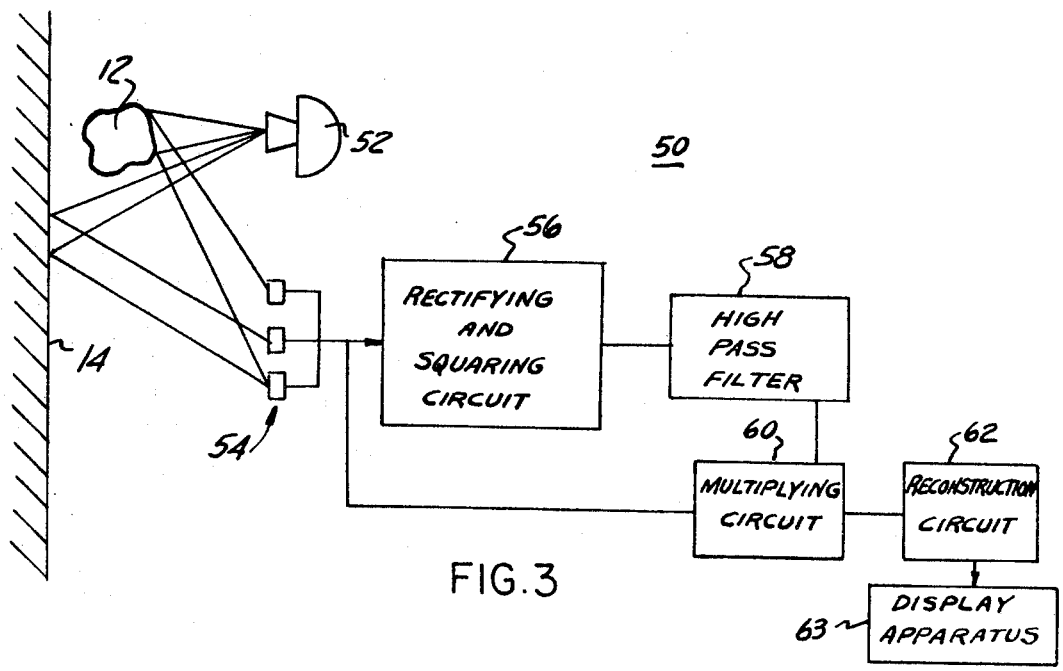
FIG. 3 is a schematic, block circuit diagram of a system for multiplying a multicomponent signal such as an acoustic signal having strong and weak signal components by the intensity distribution of the high-frequency portion of that signal to provide a clear, sharp image of the weak signal component.

FIG. 3 illustrates a system 50 using acoustic wave energy to produce a strong, clear image of object 12 located proximate an unwanted reflecting background 14. Acoustic energy is one example of the many wave energies that have frequencies lower than the frequency of optic wave energy and can therefore be recorded directly. The system 50 differs from the optic system illustrated in FIGS. 1 and 2 in that because of the lower frequency of acoustic energy there is no need to form a hologram of any signal in order to record and later reproduce that signal so that it can be conveniently multiplied by the intensity distribution of the high-frequency portion of that signal.

The system 50 includes a sonic transmitter 52 which directs coherent acoustic energy to strike and be scattered or reflected from object 12 and reflecting background 14. The system 50 also includes a linear array 54 of recording microphones for receiving the reflected acoustic wave energy and converting that acoustic energy to electric signals. Array 54 thus records the amplitude and phase of the acoustic wavefront received from object 12 and background 14. A rectifying and squaring circuit 56 is positioned to receive electric signals from the array 54 of recording microphones and provide an output comprising the intensity distribution or, in other words the square of the absolute value of the electric signal received from the array 54 of recording microphones. A filter circuit 58 receives the output signal from circuit 56 and removes the low spatial frequency signal component from that received signal. The output from filtering circuit 58 is the high spatial frequency portion of the intensity distribution of the signal received from the array 54 of recording microphones. A multiplier 60 receives the high spatial frequency intensity distribution signal provided by filter 58. Multiplier 60 also receives the signal recorded by array 54 of recording microphones representing the wavefront of acoustic energy reflected from object 12 and background 14, and multiplies the two received signals to provide an output signal that is represented mathematically by equation 5 above. Reconstruction apparatus 62 receives this output signal and removes unwanted components electronically by multiplying the received signal by appropriate transformation factors. Reconstruction apparatus 62 provides an output comprising the product of the square of the strong or background signal component and the weak or object signal component. The output of the reconstruction apparatus 62 is used to control the operation of a display apparatus 63 such as a cathode ray tube to provide a clear, strong image of object 12.

In operation, coherent acoustic wave energy from transmitter 52 is reflected by object 12 and background 14 to strike the array 54 of recording microphones. This array records the wavefront of the reflected acoustic energy to provide an electric signal that is represented mathematically by the expression $(S_1 + S_2)$. Circuit 56 forms the intensity distribution of this signal which is represented by Equation (2) above. Filter 58 removes the low spatial frequency component $|S_2|^2$ from this intensity distribution and transmits the filtered, high spatial frequency portion of the intensity distribution to multiplier 60. For an embodiment in which the wave energy reflected from background 14 represents a virtual image of a source that is small with respect to the object 12 such as a point source, filter circuit 58 removes the low spatial frequency component of the received signal by simply subtracting the average of the signals received by all microphones of the array 54 from each signal or signal component received by each individual microphone. When the unwanted signal component does not represent a virtual image of a localized or point source, filter circuit 58 separates the low spatial frequency component of a signal received by array 54 by forming the Fourier transform of the received signal. The low spatial frequency component is then filtered and removed, and the separation of the remaining high spatial frequency portions of the signal is eliminated by forming a second Fourier transform of these high spatial frequency signal portions. Multiplier 60 receives the signal recorded by array 54 of recording microphones and multiplies this signal by the high pass filtered intensity distribution received from filter circuit 58 to provide an output signal represented by equation 5 above. Unwanted signal components $S_1^*S_2^2$ and $S_1^2S_2^*$ are removed from the product signal provided by multiplying circuit 60 by reconstruction circuit 62. Reconstruction circuit 62 multiplies the product signal from multiplying circuit 60 by an appropriate transformation factor to remove the unwanted signal components. That is, reconstruction circuit 62 multiplies a received signal by a Fourier transformation to remove unwanted signal components when the signal received by array 54 of recording microphones is received from an object 12 and background 14 spaced a substantial distance from that array. Reconstruction circuit 62 multiplies a received signal by a Fresnel transformation factor when object 12 and background 14 are spaced an intermediate distance from that array. And, reconstruction circuit 62 multiplies received signals by a near term transformation factor when object 12 and background 14 are spaced close to array 54. The output signal from reconstruction apparatus 62 has a high signal-to-noise ratio—the signal representing object 12 and the noise representing background 14—and can therefore be used to control operation of display 63 to provide a clear image of that object.

Having thus described several embodiments of the invention, a number of modifications will occur to those skilled in the art.

Therefore, what is claimed is:

1. A method for providing an enhanced image of an object using a wave energy signal having a first signal component representing said object and a second signal component different from said first signal component that is mixed with said first signal component comprising the steps of:

providing a representation of the spatial distribution of the intensity of said wave energy signal;

removing at least one low spatial frequency component from said spatial distribution of intensity;

multiplying said signal and the remaining high spatial frequency portion of said spatial distribution of intensity, said multiplication providing a multicomponent output signal having one output signal component comprising the product of said first component and the intensity distribution of said second component, said one output signal component providing a clear image of said object.

2. The method of claim 1 in which:

said spatial distribution of intensity comprises the square of the absolute value of the spatial distribution of said wave energy signal and is represented mathematically by the equation:

$$|S|^2 = |S_1|^2 + |S_2|^2 + S_1^*S_2 + S_1S_2^*$$

where:
$|S|^2 =$ said intensity distribution;
$S =$ said wave energy signal distribution;
$S_1 =$ said first component
$S_2 =$ said second component; and
$S_1^*$ and $S_2^* =$ the complex conjugates of $S_1$ and $S_2$, respectively;

said step of removing at least one low spatial frequency component from said intensity distribution comprises the removal of the component represented by said $|S_2|^2$ term.

3. The method of claim 2 in which:

said multiplying step is represented mathematically by the expression:

$$S \cdot |\widetilde{S}|^2 = 2|S_1|^2 S_2 + S_1|S_2|^2 + S_1^*S_2^2 + S_1^2S_2^* + S_1|S_1|^2$$

where:
$|\widetilde{S}|^2 =$ said high spatial frequency portion of said intensity distribution; and said one output signal component providing said clear image is represented by said $S_1|S_2|^2$ term.

4. The method of claim 3 in which:

said first signal component comprises a weak signal component and said second signal component comprises a strong signal component representing a virtual image of a source that is small with respect to said object and that would otherwise mask said weak component and prevent the formation of an image; and said first and second signal components are mutually coherent with each other.

5. The method of claim 3 further including the step of electronically removing the $S_1^*S_2^2$ and $S_1^2S_2^*$ components from said $S \cdot |\widetilde{S}|^2$ product signal in order to enhance the image provided by said $|S_2|^2S_1$ signal component.

6. The method of claim 3 further including the step of multiplying said $S \cdot |\widetilde{S}|^2$ product signal by an appropriate transformation factor to remove the $S_1^*S_2^2$ and $S_1^2S_2^*$ components from said $S \cdot |\widetilde{S}|^2$ product signal in order to enhance the image provided by said $|S_2|^2S_1$ signal component.

7. The method of claim 1 in which:

said wave energy signal comprises an optic signal; and said steps of providing a representation of the spatial distribution of the intensity of said signal and of removing said at least one low spatial frequency component from said spatial distribution of intensity are performed simultaneously by directing said signal onto an area square-law detector having a poor low spatial frequency response, said area detector recording the high spatial frequency portion of the intensity distribution of said signal.

8. The method of claim 7 in which said first and second signal components of said wave energy signal are mutually coherent and said multiplying includes:
   mixing a reference signal with said wave energy signal to form a hologram on a recording surface;
   aligning said hologram with said recorded area detector; and
   directing a reference beam to strike and be modulated by said hologram to recreate said wave energy signal, said recreated wave energy signal being directed to propagate from said hologram to strike and be multiplied by said recorded high spatial frequency portion of said intensity distribution.

9. The method of claim 8 in which:
   said hologram is represented mathematically by the expression:

$$|R+S_1+S_2|^2$$

where:
   R = said reference signal;
   $S_1$ = said first signal component;
   $S_2$ = said second signal component; and
   said modulation of said reference beam by said hologram is represented mathematically by the expression:

$$R \cdot |R+S_1+S_2|^2$$

said reference signal striking said hologram causes a multicomponent reconstruction signal to propagate from said hologram;
   said multicomponent reconstruction signal has an image component represented by the mathematic expression $(S_1+S_2)$;
   said $(S_1 + S_2)$ image component propagates in a direction separate from the other components of said reconstruction signal; and
   said reference signal strikes said hologram at an angle causing said $(S_1 + S_2)$ image component to intercept said recorded area detector.

10. The method of claim 1 in which:
    said step of providing a representation of the intensity of said wave energy signal includes:
    recording the spatial distribution of the amplitude of said wave energy signal; and
    rectifying and squaring said recorded spatial amplitude distribution to thereby provide said spatial intensity distribution.

11. A method for providing an enhanced image of an object disposed proximate an unwanted reflecting background comprising the steps of:
    irradiating said object and said reflecting background with coherent wave energy from a source that is small in size with respect to the size of said object;
    receiving the radiation reflected by said object and background, the small size of said source causing said received radiation from said background to comprise a wave field representing a virtual image of said small source;
    providing a representation of the spatial distribution of the intensity of said received radiation;
    removing at least one low spatial frequency component of said intensity distribution; and
    multiplying said received radiation and the remaining high spatial frequency portion of said spatial distribution of intensity, said multiplication providing a multicomponent output signal having one output signal component comprising the product of said first component and the square of said second component, said one output signal component providing a clear image of said object.

12. A device for providing an image of an object from a wave energy signal having a first signal component representing said object and a second signal component different from said first signal component that is mixed with said first signal component comprising:
    means for forming the high spatial frequency portion of the spatial distribution of the intensity of said wave energy signal; and
    means for multiplying said signal and said intensity distribution, said multiplication providing a multicomponent output signal having one signal component comprising the product of said first component and the square of said second component, said one output signal component providing a clear image of said object.

13. The device of claim 12 in which said means for forming intensity distribution of said high-frequency portion of said wave energy signal comprise an area square-law detector having a poor low spatial frequency response.

14. The device of claim 12 wherein said first and second signal components of said wave energy signal are mutually coherent and said multiplying means comprise:
    a hologram of said wave energy signal disposed proximate said recorded area square-law detector; and
    means for directing a reference signal to strike said hologram and recreate said wave energy signal, said reference signal being directed to strike said hologram at an angle that causes said recreated signal to propagate from said hologram along a direction intercepting said area detector.

15. The device of claim 14 wherein said multiplying means provide an output signal expressed by the mathematical expression:

$$S \cdot |\widetilde{S}|^2 = 2|S_1|^2 S_2 + S_1|S_2|^2 + S_1{}^*S_2{}^2 + S_1{}^2S_2{}^* + S_1|S_1|^2$$

where:
   $S$ = said wave energy signal distribution;
   $|\widetilde{S}|^2$ = said high spatial frequency portion of said intensity distribution;
   $S_1$ = said first component;
   $S_2$ = said second component;
   $S_1{}^*$ and $S_2{}^*$ = the complex conjugates of $S_1$ and $S_2$, respectively;
   $S_1|S_2|^2$ = said one signal component providing said clear image; and
   the device further includes:
   reconstruction means for electronically removing said $S_1{}^*S^2$ and $S_1{}^2S_2{}^*$ components from said product signal to further enhance said image.

* * * * *